(12) United States Patent
Kikuchi

(10) Patent No.: US 7,222,434 B2
(45) Date of Patent: May 29, 2007

(54) DRIVING DEVICE AND MEASURING INSTRUMENT

(75) Inventor: Shigeo Kikuchi, Utsunomiya (JP)

(73) Assignee: Mitutoyo Corporation, Kawasaki-shi (JP)

( * ) Notice: Subject to any disclaimer, the term of this patent is extended or adjusted under 35 U.S.C. 154(b) by 72 days.

(21) Appl. No.: 11/042,268

(22) Filed: Jan. 25, 2005

(65) Prior Publication Data

US 2005/0160612 A1 Jul. 28, 2005

(30) Foreign Application Priority Data

Jan. 26, 2004 (JP) .............................. 2004-017091

(51) Int. Cl.
*G01B 5/004* (2006.01)
(52) U.S. Cl. ............................. 33/503; 33/1 M; 384/38
(58) Field of Classification Search .................. 33/784, 33/503, 1 M; 384/38, 7, 192, 306, 309
See application file for complete search history.

(56) References Cited

U.S. PATENT DOCUMENTS

| | | | | |
|---|---|---|---|---|
| 4,442,607 A | * | 4/1984 | Sakata et al. ................. | 33/1 M |
| 4,466,195 A | | 8/1984 | Herzog | |
| 4,592,146 A | * | 6/1986 | Campbell ...................... | 33/630 |
| 4,594,791 A | * | 6/1986 | Brandstetter .................. | 33/503 |
| 4,630,381 A | * | 12/1986 | Sakata et al. ................. | 33/503 |
| 4,637,738 A | | 1/1987 | Barkley | |
| 4,682,418 A | * | 7/1987 | Tuss et al. .................... | 33/1 M |
| 4,727,653 A | * | 3/1988 | Fujitani et al. ................ | 33/503 |
| 4,852,267 A | * | 8/1989 | Tezuka ......................... | 33/503 |
| 5,042,162 A | * | 8/1991 | Helms .......................... | 33/503 |
| 5,173,613 A | * | 12/1992 | Henry et al. ........... | 250/559.19 |
| 5,176,454 A | * | 1/1993 | Schlereth ..................... | 384/45 |
| 5,249,867 A | * | 10/1993 | Iida ............................. | 384/45 |
| 5,257,461 A | * | 11/1993 | Raleigh et al. ............... | 33/503 |
| 5,329,825 A | * | 7/1994 | Askins ....................... | 74/89.32 |
| 6,672,763 B1 | * | 1/2004 | Tschetschorke ................ | 384/9 |
| 6,941,669 B2 | * | 9/2005 | Shivaswamy et al. ........ | 33/502 |
| 7,114,265 B2 | * | 10/2006 | Mies ............................ | 33/503 |
| 2001/0013177 A1 | | 8/2001 | Jacobs et al. | |
| 2004/0205974 A1 | * | 10/2004 | Ogura ......................... | 33/503 |

FOREIGN PATENT DOCUMENTS

JP 3-45321 7/1991

* cited by examiner

*Primary Examiner*—Yaritza Guadalupe-McCall
*Assistant Examiner*—Tania Courson
(74) *Attorney, Agent, or Firm*—Rankin, Hill, Porter & Clark LLP

(57) ABSTRACT

A supporting device (300) for supporting a guide rail (200) for guiding a movable member subjected to relative displacement in relation to the base table (3). The supporting device includes, base bodies (410, 510) engaged onto the base table (3) and carrying the guide rail (200), and holding section (440, 530) for holding the guide rail (200) intervening between the guide rail (200) in the state where the guide rail is carried by the base bodies (410, 510). The holding section (440, 530) supports the guide rail (200) in the state where it can move swingingly. A change in the posture or position of the base bodies (410, 510) is offset with a swinging movement by the holding section, and does not affect the guide rail. As a result, excessive force is not applied on the guide rail, so that the form of the guide rail is maintained.

7 Claims, 9 Drawing Sheets

FIG.8
PRIOR ART
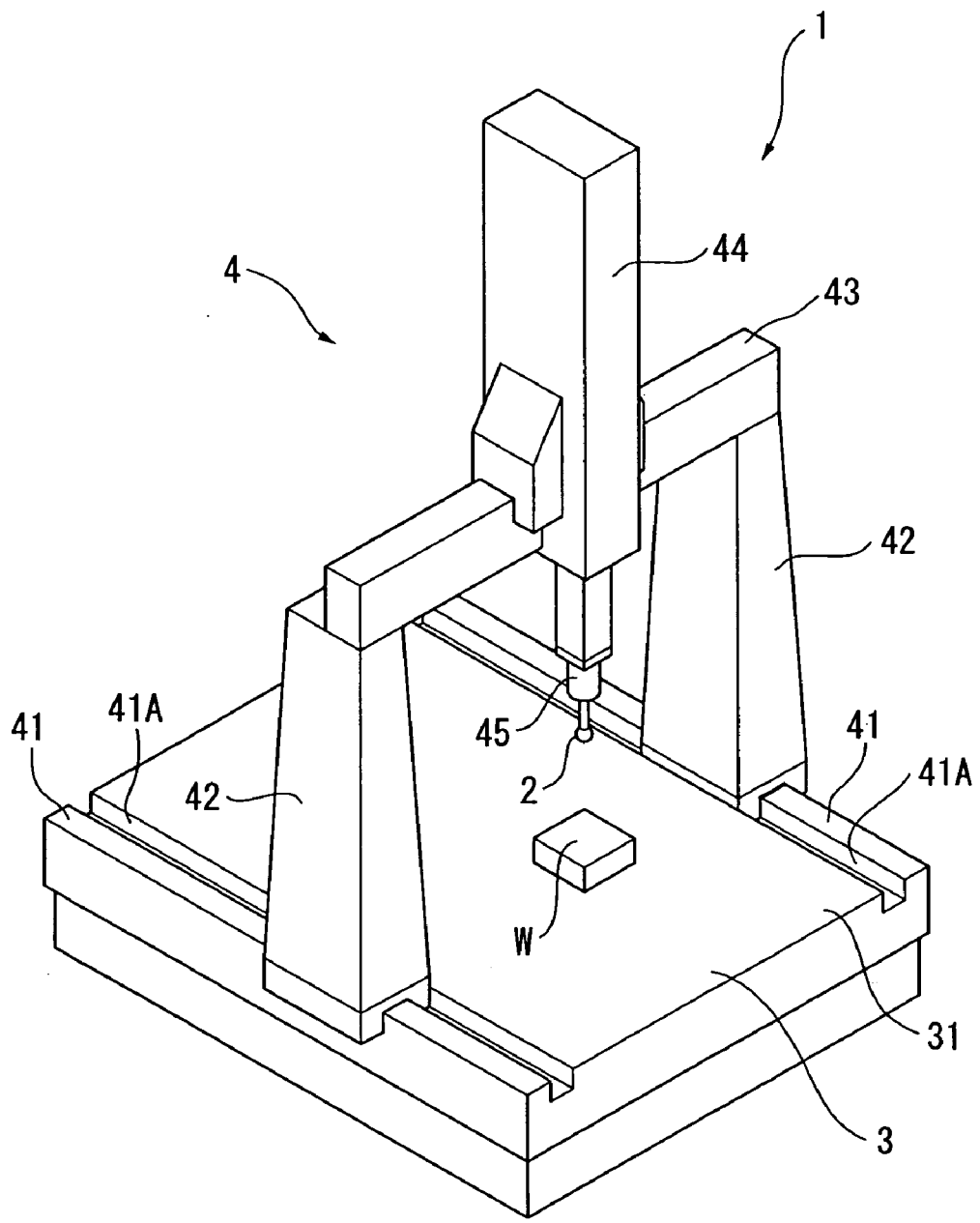
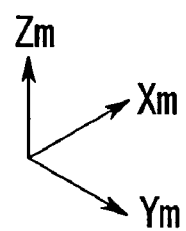

DRIVING DEVICE AND MEASURING INSTRUMENT

BACKGROUND OF THE INVENTION

1. Field of the Invention

The present invention relates to a guide rail supporting device, a guide rail device, a driving device and a measuring instrument.

2. Description of Related Art

There has been known a driving device having a guide rail as a guide mechanism, and there has also been known a measuring instrument with which a stylus is three-dimensionally displaced by this driving device to measure a form of a workpiece (refer to, for instance, Japanese Patent Publication No. HEI 3-45321).

In FIG. 8 is shown a coordinate measuring instrument 1 as an example of the measuring instrument.

The coordinate measuring instrument 1 comprises a stylus 2 applied onto a workpiece W for detecting a surface of the workpiece, a measuring table 3 having a table surface 31 for pulling thereon the workpiece W, a driving mechanism (driving device) 4 directly provided on the measuring table 3 for three-dimensionally moving the stylus 2, and a driving sensor (not shown) for detecting a driving quantity of the driving mechanism 4.

The driving mechanism 4 comprises a guide rail 41 provided straight in the Ym-axis direction along both side ends of the measuring table; two beam supporting bodies 42 each having a height in the Zm-axis direction, which is a substantially vertical direction from both side ends of the measuring table 3 toward the measuring table 3, and provided so that the guide rail 41 can slide in the Ym-axis direction; a beam 43 supported by an upper end of the beam supporting bodies 42 and having a length in the Xm-axis direction; a column 44 slidably provided in the Xm-axis direction in relation to the beam 43 and having a guide in the Zm-axis direction; and a spindle 45 slidably provided in the Zm-axis direction within the column 44 and holding the stylus 2 at a lower end thereof.

The guide rail 41 is integrated with the measuring table 3 along the side end of the measuring table 3 via a groove 41A grooved at a slight distance from the side end of the measuring table 3.

The lower end of the beam supporting bodies 42 overpasses the guide rail 41, and the movement direction of the beam supporting bodies 42 is guided straight by the guide rail 41.

It is to be noted that the driving mechanism 4 has, for instance, a motor or the like as a driving section for moving the beam supporting body 42, the column 44 and the spindle 45, and this driving section is controlled for driving by a drive control section (not shown).

The driving sensor comprises, though not shown specifically, a Ym-axis sensor for detecting a movement of the beam supporting body 42 in the Ym-axis direction, an Xm-axis sensor for detecting a movement of the column 44 in the Xm-axis direction, and a Zm-axis sensor for detecting a movement of the spindle 45 in the Zm-axis direction.

For instance, the Ym-axis sensor comprises a scale member having a length measuring direction in the Ym-axis direction and provided on the guide rail 41, a detecting section provided at the lower end of the beam supporting body 42 for detecting displacement in relation to the scale member.

With the configuration as described above, the stylus 2 is three-dimensionally moved by the driving mechanism 4, and then a drive quantity of the driving mechanism 4 is detected by a driving sensor at the time when the stylus 2 is applied onto the workpiece W. Thus a form of the workpiece W is measured.

At this time, the beam supporting body 42 is guided straight by the guide rail 41, so that a drive thereof is smooth and a speed thereof is also fast. Further, straightness of a scale member is maintained by the guide rail 41, so that a drive quantity of the beam supporting body 42 is detected accurately by the Ym-axis sensor. Then a detected value by the Ym-axis sensor is analyzed in addition to a drive quantity of the column 44 and the spindle 45 to correctly measure a form of the workpiece W.

There occurs a problem, however, that, because the guide rail 41 is integrated with the measuring table 3, the guide rail 41 and the measuring table 3 cannot maintain each form independently to each other, so that, when one is deformed, the other is correspondingly deformed.

For instance, when a workpiece W is put on the table surface 31, as shown in FIG. 9A, there is a disadvantageous possibility that the central part of the measuring table 3 is dented and become curved owing to weight of the workpiece W. The result is that the guide rail 41 also becomes curved.

Or, when one edge of the measuring table 3 and another edge thereof have a different temperature to each other, this temperature difference generates a difference in displacement (thermal expansion quantity) between one edge and another edge. Then, as shown in FIG. 9B, the difference in displacement of the two ends generates deformation in the measuring table 3, so that the guide rail 41 provided on one edge and another edge of the measuring table 3 is deformed.

When the guide rail 41 is deformed as described above, there occurs a problem that the beam supporting body 42 is not guided straight and is deviated from a proper track.

When the guide rail 41 becomes curved, a distance between the two beam supporting bodies 42 is changed, thereby the beam 43 is also deformed and a position of the column 44 is changed, too. As a result, an error is generated in the position of the stylus 2, so that there occurs a problem that measuring accuracy is deteriorated. Further, when the guide rail 41 becomes curved, harmful loading imposed on the driving mechanism 4 is increased, which degrades a driving performance of the driving mechanism 4. For instance, when the guide rail 41 becomes curved, sliding resistance between the guide rail 41 and the beam supporting body 42 changes, so that loading imposed on a driving section also changes. As a result, control characteristics change, which increases unnecessary harmful vibration. Further, when harmful loading imposed on the driving mechanism 4 is increased, a portion thereof subject to sliding is intensively abraded. Then an economic loss such as deterioration in a life cycle thereof as a product, an increase in cost of maintenance or the like is caused.

Further, when the guide rail 41 becomes curved, the scale member is also curved, so that there occurs a problem that measuring accuracy of the driving sensor is deteriorated. Degraded measuring accuracy of a stylus coordinate not only leads to an error in measuring, but also generates an error in positioning of the stylus 2.

With the problems described above occurred when the guide rail 41 becomes curved, it has been difficult to improve the driving performance (including track accuracy, driving speed and positioning accuracy) and also to improve detecting accuracy of the driving sensor.

SUMMARY OF THE INVENTION

A main object of the present invention is to solve the conventional problems and to provide a guide rail supporting device in the state where a form of at least either one of a guide rail or a base table is maintained, a guide rail device, a driving device and a measuring instrument.

The guide rail supporting device according to the present invention is a supporting device for supporting a guide rail used for guiding a movable member while keeping the guide rail in a substantially fixed position in relation to a base table, and the guide rail supporting device is characterized in that it comprises a holding section for holding the guide rail in a manner that, when at least either one of the base table or the guide rail is deformed, deformation in one side is not transmitted to the other side.

With the configuration as described above, it is avoidable that deformation of either the base table or the guide rail affects the other, and a form of the other can be maintained.

For instance, the base table and the guide rail undergo thermal deformation by a temperature change in the ambient environment or heat radiated from an operator(s). In this case, as the base table and the guide rail have a different heat expansion coefficient to each other, they may have different expansion and contraction to each other. Further, the base table may be deformed by weight of an object put on the base table, or the guide rail may be deformed by a movable member sliding on the guide rail. However, even when the base table or the guide rail is deformed as described above, deformation of either one of the base table or the guide rail is not transmitted to the other with a holding section, and, for instance, when the base table is deformed, the deformation thereof is not transmitted to the guide rail, so that a form of the guide rail can be maintained. When the guide rail is originally formed to be straight, straightness of the guide rail is maintained, and the guiding direction of a movable member is thus maintained straight.

Herein, a component subject to deformation may be only either one of the base table or the guide rail, and may be both the base table and the guide rail. When both the base table and the guide rail are deformed, each deformation is accepted in the holding section, so that a form of each of the base table and the guide rail can be maintained without affecting each other.

In the present invention, the holding section preferably holds the guide rail in at least either one of the states where it can swing or where it can move forward and backward in relation to the base table.

With the configuration as described above, for instance, when the base table undergoes bending deformation resulting from nonuniform thermal distribution or when the base table or the guide rail expands and contracts, a form of the guide rail can be maintained with the holding section.

For instance, when the base table and the guide rail have different expansion and contraction to each other due to a difference of a heat expansion coefficient to each other, the guide rail can be moved forward and backward in relation to the base table with the holding section, so that the difference of heat expansion can be let out. Or, when either one of the base table or the guide rail becomes tilted, the guide rail is swingingly moved in relation to the base table with the holding section, so that the tilt is offset, enabling a tilt of either one of the base table or the guide rail not to be transmitted to the other.

In the present invention, it is preferable that the guide rail supporting device comprises a base body engaged onto the base table and carrying the guide rail; and the holding section comprises a holding plate abutting on the guide rail to hold the same, a fixing plate fixed to the base body, and a holding coupling section for coupling the holding plate in the state where it can move swingingly in relation to the fixing plate.

With the configuration as described above, the supporting device is engaged onto the base table, and this supporting device supports the guide rail. Then the guide rail is put into the state where it is attached to the base table. At this time, the base body is engaged onto the base table so that the base body can carry the guide rail. Then the guide rail is applied (or placed) onto the holding section, and the guide rail is held by the holding section. Thus the guide rail is carried by the base body in the state where the guide rail is held by the holing section.

With the configuration as described above, the guide rail is held by a holding plate, while the holding plate is supported in the state where it can move swingingly by the holding coupling section. Thus, when a posture of the base body is changed, the change of the base body is offset by a swinging movement of the holding plate. Consequently, the change generated in the base body does not affect the guide rail so that the guide rail is maintained in an original state. For instance, if the guide rail is formed straight, the guide rail is maintained by the supporting device in the straight state as originally formed.

When a change of a form or the like is produced in the base table, a posture of the base body is also changed, however, as the change of the base body is offset with a swinging movement by the holding section, the guide rail is maintained in an original state.

Then a movable member guided by the guide rail is guided along a proper track, and, in addition, control characteristics of the movable member will not be deteriorated, so that unnecessary harmful vibration will not be generated, either. When the guide rail is provided with a scale member, a form of the scale member is maintained, so that detecting accuracy by the scale member is improved, and furthermore, positioning accuracy of the movable member is improved.

As used herein, the term "holding" shall include maintaining a posture of the guide rail by supporting weight from a bottom face or by supporting a tilt from a side face.

Further, the guide rail may be formed straight, or may be originally formed in a curved shape. According to the present invention, regardless of an original form of the guide rail, the form of the guide rail can be maintained without being subjected to action by deformation of the base table or the like. For instance, if the guide rail is originally formed straight, straightness of the guide rail can be maintained.

As the base table, for instance, a measuring table for a measuring instrument or a process machinery may be exemplified, however, any base table with the guide rail attached thereto may be employed.

In the present invention, the holding coupling section preferably couples the fixed plate and the holding plate in the state where the holding plate can swingingly move in relation to the fixed plate, as well as in the state where the holding plate can move in the direction along the face of the guide rail held by the holding plate.

As described above, when the holding plate slidably moves by the holding coupling section, movement of the base body can be offset by displacement of the holding plate, excessive force will not act on the guide rail. Thus the guide rail can be supported in the state where an original form of the guide rail is maintained.

As used herein, the term "the holding plate can move in the direction along the face of the guide rail held by the holding plate" shall be equivalent to that the holding plate can move in the direction orthogonal to the opposing direction of the fixed plate and the holding plate, for instance, in a case where the fixed plate and the holding plate are opposed to each other in the vertical direction to the face of the guide rail, so that the holding coupling section is provided between the fixed plate and the holding plate.

In the present invention, preferably, the holding coupling section comprises a first connecting plate and a second connecting plate each layered between the fixed plate and the holding plate, a first cylindrical body firmly held between the holding plate and the first connecting plate, and a second cylindrical body firmly held between the first connecting plate and the second connecting plate, wherein the first cylindrical body and the second cylindrical body make an angle of 90 degrees across the first connecting plate.

With the configuration as described above, the holding plate is supported in the state where it can move swingingly by the first and the second cylindrical bodies three-dimensionally intersecting between the fixed plate and the holding plate, so that the holding plate can swingingly move in all directions without any restraint. Further, if the first connecting plate and the holding plate slidably move along the cylindrical axis, the holding plate can be slid in the backward/forward and right/left directions. Thus all of the changes generated in the base body can be offset, and the guide rail can be supported without allowing excessive force to act on the guide rail.

Additionally, a swingingly-moving axis of the holding coupling section is a cylindrical body, so that the holding coupling section is excellent in durability against stress, for instance, the holding section can sufficiently support the weight of the guide rail, and will not swingingly move to no avail during holding.

In the present invention, it is preferable that the second connecting plate can rotate on a pivot bearing to the fixed plate, and such a configuration is preferable as that in which either one of the fixed plate or the second connecting plate is provided with a conical concave portion recessed thereon, and the other is provided with a conical convex portion freely engaged with the conical concave portion.

With the configuration as described above, the second connecting plate can move rotatably in relation to the fixed plate. Namely, the holding section can move rotatably in relation to the fixed plate. Then, even when the base body is subject to deformation (or displacement) related to a rotational system, deformation (or displacement) of the base body is offset by rotating movement of the holding plate, so that the guide rail is held in the state where excessive force does not act thereon.

In the present invention, preferably, the holding coupling section comprises a ball body firmly held between the holding plate and the fixed plate, and each of the holding plate and the fixed plate has a V-shaped groove formed in each of the opposing face to each other, and the V-shaped groove on the holding plate and the V-shaped groove on the fixed plate make an angle of 90 degrees across the ball body.

With the configuration as described above, the holding plate is supported in the state where it moves swingingly by the ball body. Further, the ball body slidably moves along the V-shaped groove on the fixed plate, while the holding plate slidably moves along the V-shaped groove on the holding plate. Thus the holding plate is supported in the state where it moves swingingly in all directions as well as it moves slidably. Therefore all of the changes generated in the base body are offset, and thus the guide rail is supported in the state where excessive force will not act on the guide rail.

As the holding plate is supported in the state where it moves swingingly by the ball body, resistance during the swinging movement is low, so that the guide rail is supported in the state where excessive force hardly acts on the guide rail.

In the present invention, the holding coupling section may comprise a swingingly-moving body supported in the state where it moves swingingly by the fixed body, and a cylindrical body provided on the swingingly-moving body and supporting the holding plate in the state where it moves swingingly.

It is to be noted that the configuration of the holding coupling section is not specifically limited, and the configuration is allowable in which the holding plate and the fixed plate are coupled in the state where they move swingingly, or the holding plate and the fixed plate are coupled in the state where they can move swingingly as well as they can move in parallel.

In the present invention, preferably, the guide rail supporting device comprises a base body engaged onto the base table and carrying the guide rail, and a pulling section loaded between the base body and the guide rail for pulling the guide rail toward the base body.

With the configuration as described above, the guide rail is pulled by the pulling section toward the base body and thus the pulled guide rail is supported by the holding section. As the guide rail is pulled by the pulling section, the guide rail is held without being raised from the holding section, and a position of the guide rail is determined. Then, for instance, when a movable member slides on the guide rail, a position of the guide rail is fixed, so that the movable member can be guided accurately.

Herein the pulling section may have a configuration in which energizing force of an elastic body such as a spring, rubber or the like is used, or a configuration in which magnetic attraction is used.

In the present invention, preferably, the guide rail supporting device comprises a base body engaged onto the base table and carrying the guide rail; in which the base body comprises a mounting section, which is in horizontal state when the base table is engaged onto the base table, to support the guide rail from below, and a backboard section, which continuously rises from one edge of the mounting section, to be engaged onto the base table; and in which the holding section comprises a mounting section-side holding section provided on the mounting section for propping up the guide rail, and a backboard-side holding section for holding the guide rail on the side of the backboard section.

With the configuration as described above, two of the faces of the guide rail, namely, a bottom face and a side face are held by the mounting section-side holding section and the backboard-side holding section. As not only the bottom face but also the side face are held, the guide rail is supported in the state where a posture thereof is constantly maintained.

In the present invention, preferably, the guide rail supporting device comprises a one end-side supporting device for supporting the one end side of the guide rail, and a supporting device for supporting the other portion of the guide rail; and the one end-side supporting device comprises a base body engaged onto the base table and carrying the guide rail, and a joint section for jointing the guide rail and the base body.

With the configuration as described above, the guide rail is jointed to the one end-side supporting device by the joint section, however, the other portion of the guide rail is not jointed to but only held by the holding section. Namely, the guide rail is firmly fixed to the one end-side supporting device, but the other portion thereof is not fixed to the supporting device.

For instance, when the base table expands and contracts owing to thermal expansion or the like, spacing or the like of the supporting device engaged onto the base table changes. Then, as the guide rail is fixed only to the one end-side supporting device, the guide rail can change a relative position between the same and other supporting devices to a certain extent. Therefore, if the base table and the guide rail have a different thermal expansion quantity to each other, the guide rail can independently expand and contract without being affected by the thermal expansion quantity of the base table. Consequently, excessive force does not act on the guide rail, and the guide rail is supported in the state where a form thereof is maintained.

Further, as the guide rail is jointed to the one end-side supporting device, a relative position thereof in relation to the base table is fixed on one side thereof via the supporting device. Then, for instance, when the guide rail is provided with a scale member or the like, the original position on one side of the guide rail in relation to the base table is not changed and can be maintained.

It is to be noted that as for the joint section, any configuration is allowable in which the guide rail and the base body are jointed, for instance, the guide rail and the base body may be fixed to each other with a screw.

In the present invention, preferably, the guide rail supporting device comprises a base body engaged onto the base table and carrying the guide rail, and a joint section for jointing the guide rail to the base body, and the joint section comprises a fixed portion fixed to the base body, a joint portion jointed to the guide rail, a joint coupling section provided between the fixed portion and the joint portion for coupling the joint portion in the state where it can move swingingly in relation to the fixed portion.

With the configuration as described above, the guide rail is jointed via the fixed portion to the base body in the state where the guide rail is jointed to the joint portion. Then the joint portion can move swingingly in relation to the fixed portion by the joint coupling section. Thus, after the guide rail is jointed to the joint portion, the joint portion can be moved swingingly to carry out an alignment adjustment or the like of the guide rail in relation to the base table. Thus the guide rail can be supported by the supporting device in the state where the guide rail is subject to the alignment adjustment.

In the present invention, preferably, the joint coupling section comprises a ball body applied onto a side face of the fixed portion in the state where it moves rotatably, a swingingly-moving connecting plate firmly holding the ball body with itself and the fixed portion, a pressuring force adjustment section for adjusting a pressuring force for pressuring the swingingly-moving connecting plate toward the fixed portion.

Further, the pressuring force adjustment section may have a configuration, as an example, in which an adjustment screw is provided with one end thereof applied onto the swingingly-moving connecting plate after penetrating the joint section, and with the other end thereof protruded from a side face of the joint section.

With the configuration as described above, the joint coupling section can be fixed by the pressuring force adjustment section. Namely, after an alignment adjustment of the guide rail is carried out, if only swinging movement of the join section is fixed, the joint coupling section can be fixed in the state where the alignment adjustment of the guide rail has been completed.

A guide rail device according to the present invention comprises the guide rail supporting device described above and a guide rail supported by this guide rail supporting device.

A driving device according to the present invention comprises the guide rail supporting device described above, a guide rail supported by this guide rail supporting device, and a movable member provided in the state where it can move along the guide rail.

A measuring instrument according to the present invention comprises a measuring table as the base table for putting a workpiece thereon, the guide rail supporting device described above, a guide rail supported by this guide rail supporting device, a movable member provided in the state where it can move along the guide rail, a detecting probe moved by the movable member for detecting a surface of the workpiece, a displacement detector for detecting a relative displacement quantity of the movable member in relation to the guide rail, and an analysis section for detecting a surface of the workpiece with the detecting probe, and analyzing a form of the workpiece based on a detected value by the displacement detector.

With the configuration as described above, the measuring instrument provides the same advantages as those of the guide rail supporting device. Namely, the guide rail can be supported in the state where a form thereof is maintained without excessive force acting thereon. Thus the driving device accurately guiding the movement direction of a movable member can be provided.

Further, when a scale member of a displacement detector is provided on the guide rail, as the scale member will not be deformed as is the case with the guide rail, detecting accuracy by the scale member can be improved. Thus the measuring instrument capable of measuring a form of a workpiece with high accuracy can be provided.

In the present invention, deformation of the base table (measuring table) does not affect the guide rail, it is contemplated that there is no problem in a slight deformation of the base table owing to weight of a workpiece or the like, which eliminates the need for enhancing rigidity of the base table, so that it is possible to reduce the thickness of the base table.

BRIEF DESCRIPTION OF THE DRAWINGS

FIG. 8 is a view showing a conventional guide rail in a three-dimensional measuring device.

DETAILED DESCRIPTION OF PREFERRED EMBODIMENT(S)

Figure 1:
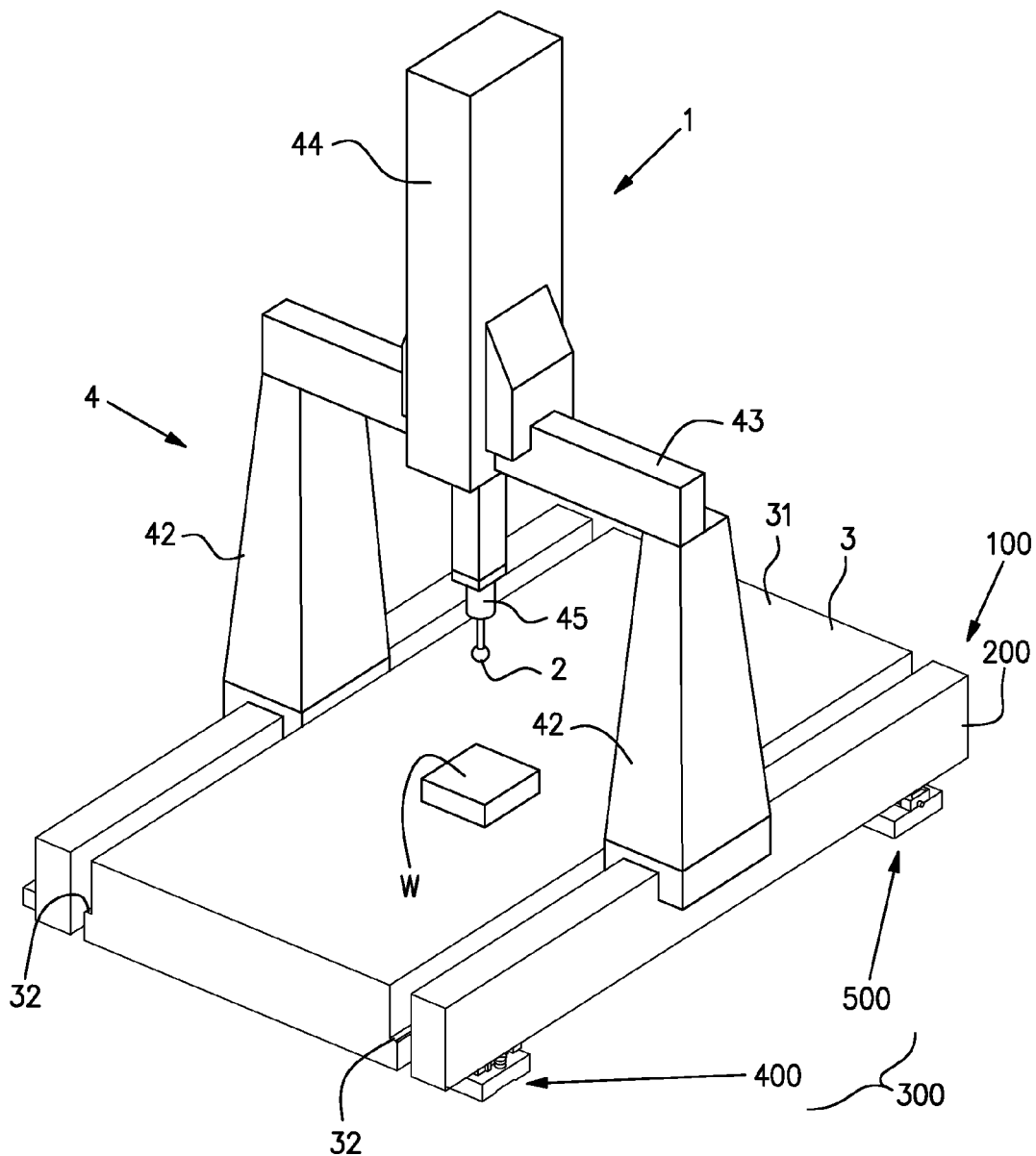
FIG. 1 is a view showing an embodiment concerning a guide rail device according to the present invention.

An embodiment of the present invention is shown below with reference to the related drawings, and is also described with reference to the reference numerals designated to each component in the drawings.

A general perspective illustration of an embodiment concerning a guide rail device according to the present invention is shown in FIG. 1. In FIG. 1, a guide rail device 100 is mounted on each of both side faces of a measuring table (base table) 3.

The measuring table 3 is substantially the same as that explained in the description of related art, and has a table surface 31 formed to be substantially flat. Each of both side faces of the measuring table 3 is provided with a flange mounting section 32 formed to be projected in a flange-like form.

The guide rail device 100 comprises a guide rail 200 formed straight in the longitudinal direction thereof, a supporting device 300 supporting the guide rail 200 on a side face of the measuring table 3.

The guide rail 200 has a form of a rectangular solid formed straight in the longitudinal direction thereof. With reference to FIG. 1, on the guide rail 200 is provided a slide member (movable member) such as a beam supporting body 42 in the state where it moves slidably. Then the movement direction of the slide member is guided straight by the guide rail 200.

In the description hereinafter, the configuration of the present invention is described in the state where the guide rail 200 is supported by a supporting device 300

The supporting device 300 supports the guide rail 200 in the state where straightness of the guide rail 200 is maintained in a position along a side edge of the measuring table 3. The supporting device 300 comprises a forward supporting device (one end-side supporting device) 400 for supporting the guide rail 200 on one end side of the guide rail 200, and a backward supporting device 500 for supporting the guide rail 200 on the other end side of the guide rail 200. It is to be noted that the near side is referred to as forward in FIG. 1, while the far side is referred to as backward in the same figure.

Figure 2:
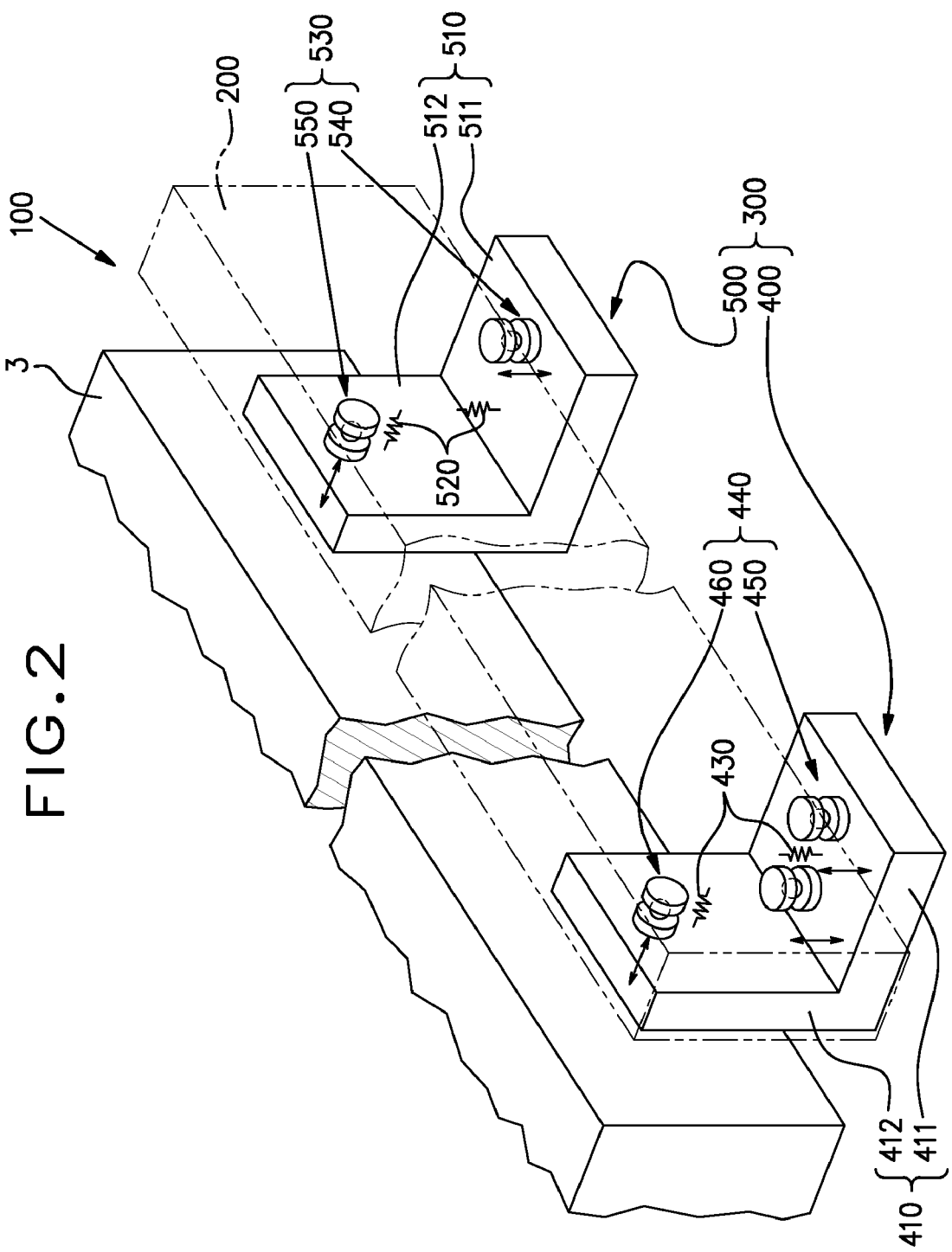
FIG. 2 is a conceptual diagram showing a supporting device in the embodiment described above.
Figure 3:
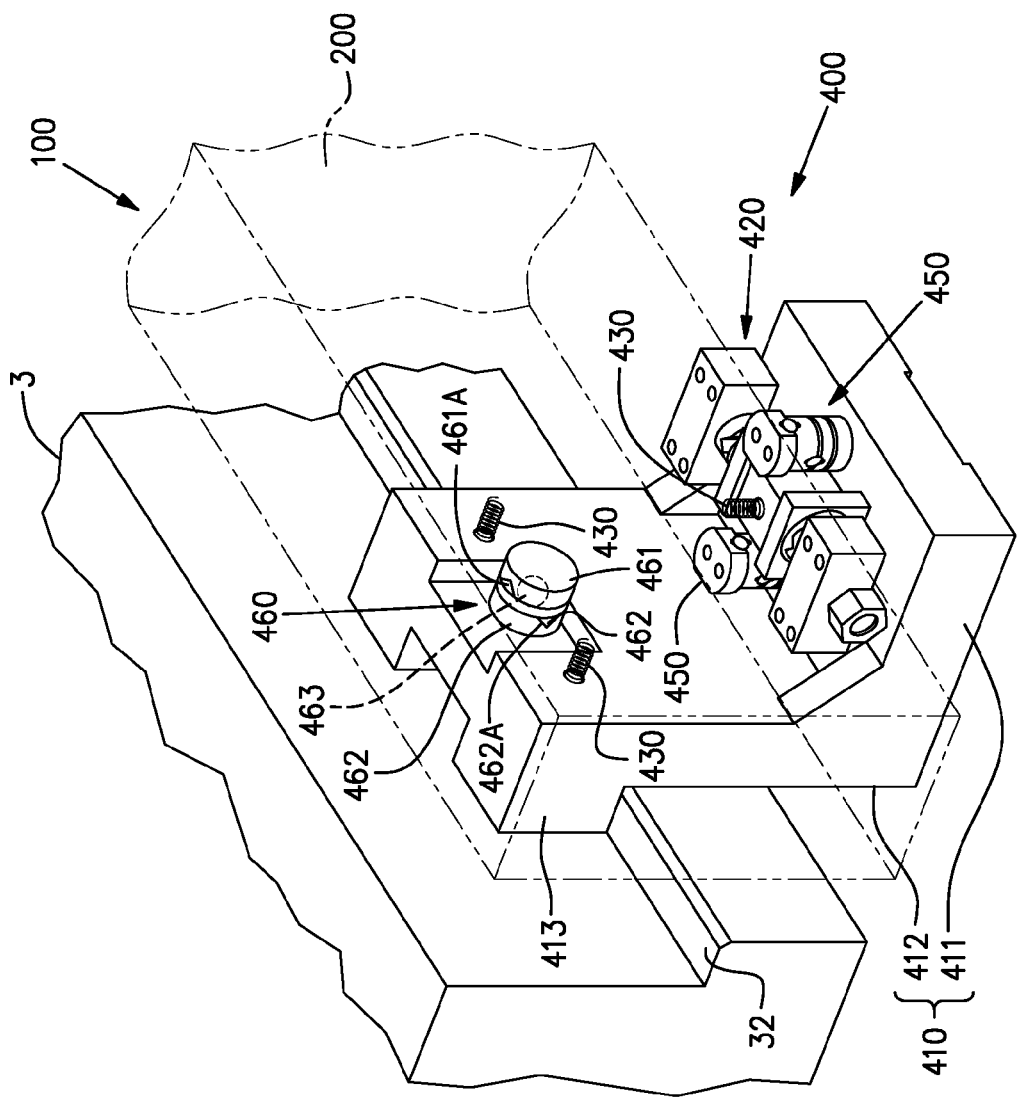
FIG. 3 is a view showing a configuration of a forward supporting device in the embodiment described above.

In FIG. 2 is shown a conceptual diagram conceptually illustrating a mechanism of the supporting device (forward supporting device 400 and backward supporting device 500). In addition, in FIG. 3 is shown a configuration of the forward supporting device 400.

The forward supporting device 400 comprises a base body 410 engaged onto a side section of the measuring table 3 for carrying the guide rail 200 for propping up the same, a joint section 420 jointed to the guide rail 200 for jointing the guide rail 200 and the base body 410, a pulling spring 430 with one end thereof fixed to the base body 410 and with the other end thereof connected to the guide rail 200 for pulling the guide rail 200 to the base body 410, a holding section 440 for holding the guide rail 200 pulled by the pulling spring 430.

The base body 410 comprises a mounting section 411 being a plate-like body placed substantially in parallel to a table face 31 in the state where the base body 410 is engaged onto the measuring table 3 and supporting the guide rail 200 from underneath, and a backboard section 412 engaged onto the measuring table 3; and is formed to have an L-shape cross section in which the backboard section 412 continuously rises up from one-side edge of the mounting section 411.

In the backboard section 412, a hook section 413 for hooking a flange mounting section 32 of the measuring table 3 is provided on the back surface side, namely, the face opposite to a surface facing to the mounting section 411. The hook section 413 is formed to continuously project from the upper end section on the back surface side of the backboard section 412.

When the hook section 413 is engaged onto the flange mounting section 32, the base body 410 is put into the state where it is engaged onto a side face of the measuring table 3. At this time the backboard section 412 is placed substantially perpendicular to the table surface 31, while the mounting section 411 is placed substantially in parallel to the table surface 31. At this time the bottom face of the mounting section 411 is flush with the bottom face of the measuring table 3, or is in a position slightly higher than the bottom face of the measuring table 3.

Figure 4:
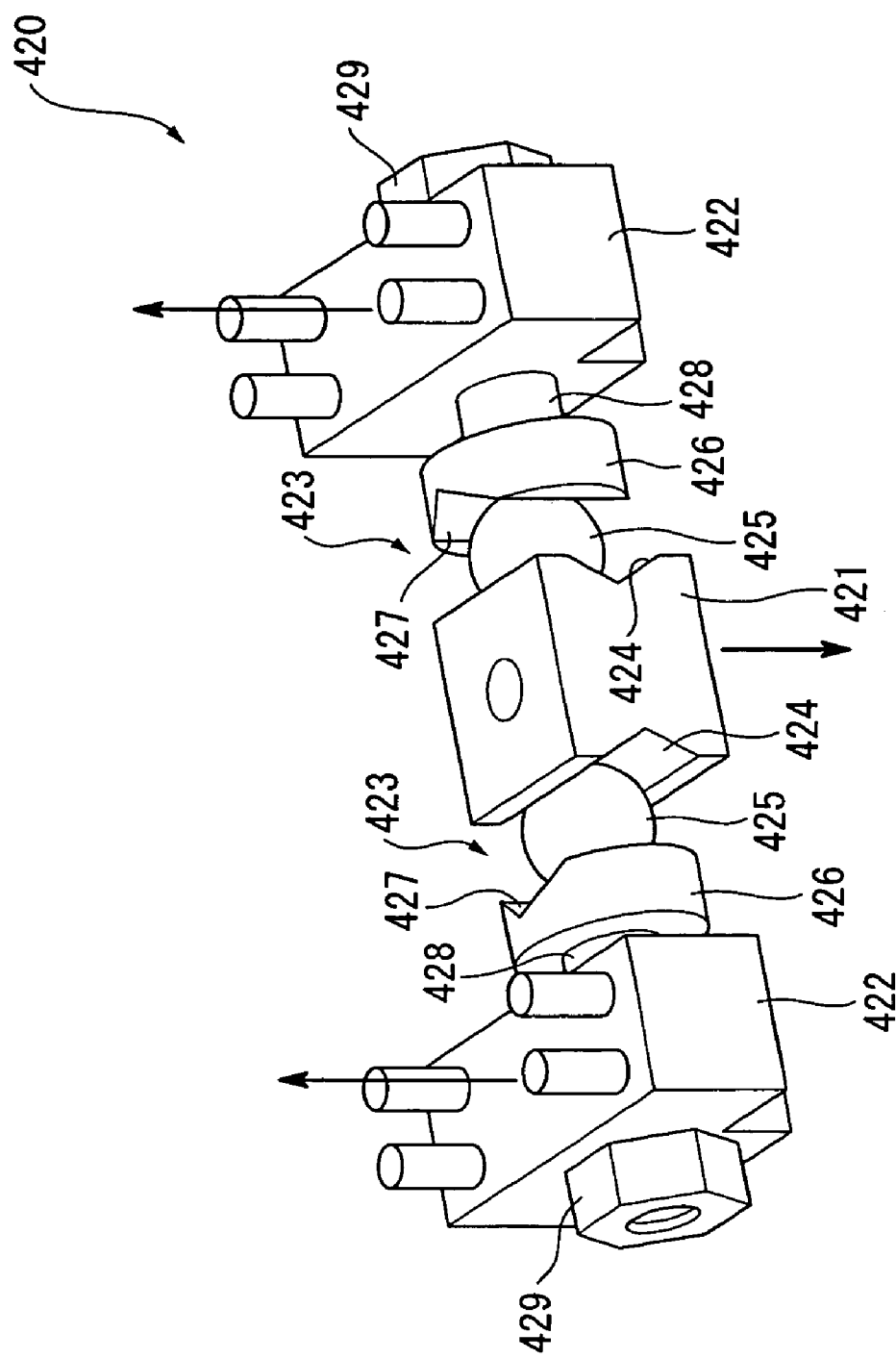
FIG. 4 is a view showing a configuration of a joint section in the embodiment described above.

The joint section 420 is provided on the top face of the mounting section 411. The configuration of the joint section 420 is shown in FIG. 4.

The joint section 420 comprises a fixed block (fixed portion) 421 being a substantially cube-shaped block mounted and fixed in the substantially central part of the top face of the mounting section 411, a joint block (joint portion) 422 provided in the state where it can move swingingly in relation to the fixed block 421 and jointed to the guide rail 200, and a coupling section (joint coupling section) 423 provided between the fixed block 421 and the joint block 422 for coupling the joint block 422 in the state where it can move swingingly in relation to the fixed block 421.

Two joint blocks 422 are provided, in the direction parallel to the longitudinal direction of the guide rail 200, with the fixed block 421 placed therebetween. Namely, the fixed block 421 and two joint blocks 422 are placed in the position corresponding to that directly below the guide rail 200.

The joint block 422 is not allowed to move in the longitudinal direction of the guide rail 200, and is provided in the state where it can move swingingly within a face orthogonal to the longitudinal direction of the guide rail 200. For instance, the joint block 422 is engaged into a hole formed to be relatively long in the direction orthogonal to the longitudinal direction of the guide rail 200 in the mounting section 411.

The joint block 422 has a pin projecting from the top face thereof, and when this pin is fit into the guide rail 200 by insertion, the joint block 422 and the guide rail 200 are jointed.

The joint section 423 is provided between the fixed block 421 and the joint block 422, and couples the joint block 422 in the state where it can move swingingly in relation to the fixed block 421. The joint section 423 comprises a ball body 425 applied onto a side face of the fixed block 421 in the state where the ball body 425 moves rotatably, a swingingly-moving connecting plate 426 firmly holding the ball body 425 with itself and the fixed block 421, and an adjustment screw 428 provided with one end thereof applied onto the swingingly-moving connecting plate 426 after penetrating the joint block 422 and with the other end thereof protruded from a side face of the joint block 422.

Two ball bodies 425 are provided in the direction parallel to the longitudinal direction of the guide rail 200, with the fixed block 421 placed therebetween. Herein on the side face of the fixed block 421 is provided a V-shaped groove 424 in a straight line, and with this V-shaped groove 424 is engaged in the ball body 425.

The swingingly-moving connecting plate 426 is placed on the opposite side of the fixed block 421 with the ball body 425 placed therebetween. The swingingly-moving connecting plate 426 has a V-shaped groove 427 on a face thereof opposing to the fixed block 421, and this V-shaped groove 427 makes an angle of 90 degrees to the V-shaped groove 424 on the fixed block 421 across the ball body 425. Then the ball body 425 is firmly held in the position where the V-shaped groove 427 on the swingingly-moving connecting plate 426 and the V-shaped groove 424 on the fixed block 421 intersect three-dimensionally.

The adjustment screw 428 is screwed with a nut 429 in the position where the adjustment screw 428 is screwed together with the joint block 422 in the state where it projects from a side face of the joint block 422, namely, at the other end of the adjustment screw 428 projecting from a side face of the joint block 422. One end of the adjustment screw 428 is applied onto the swingingly-moving connecting plate 426 with pivot bearing. Namely, in the swingingly-moving connecting plate 426, a conical concave portion is recessed on a face opposite to the V-shaped groove 427, and a ball body (steel ball) embedded in a head of one end of the adjustment screw 428 is pivoted on the concave section on the swingingly-moving connecting plate 426.

One pulling spring 430 is provided on the mounting section 411 and two pulling springs 430 are provided on the backboard section 412. The pulling springs 430 are provided, on the mounting section 411, with the fixed block 421 inserted therethrough. Further, two pulling springs 430 are provided, on the backboard section 412, with a prespecified distance maintained therebetween along the longitudinal direction of the guide rail 200.

The holding section 440 comprises a mounting section-side holding section 450 provided on the mounting section 411 for propping up the guide rail 200, and a backboard-side holding section 460 for holding the guide rail 200 pulled toward the backboard plate 412.

Two mounting section-side holding section 450 are provided in the direction orthogonal to the longitudinal direction of the guide rail 200 with the fixed block 421 placed therebetween.

Figure 5:
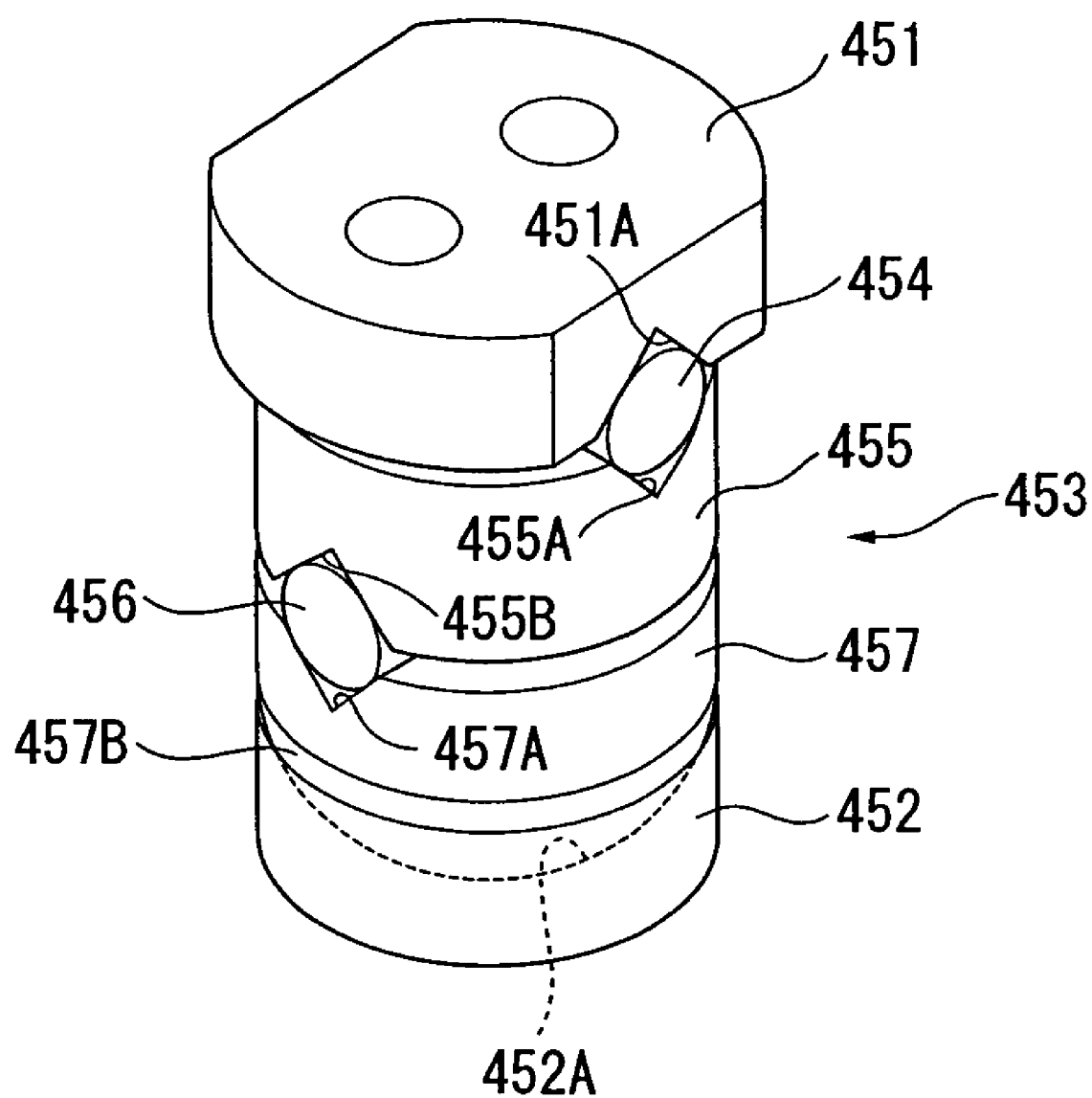
FIG. 5 is a view showing a configuration of a mounting section-side holding section in the forward supporting device in the embodiment described above.

The mounting section-side holding section 450 comprises, as shown in FIG. 5, a holding plate 451 with the top face thereof formed on a flat face applied onto the guide rail 200, a fixed plate 452 fixed on the mounting section 411 with the top face thereof recessed a conical concave section 452A, and a coupling section (holding coupling section) 453 for coupling the holding plate 451 in the state where it can move swingingly in relation to the fixed plate 452.

The coupling section 453 has a configuration in which between the holding plate 451 and the fixed plate 452 are layered an upper side connecting plate (first connecting plate) 455 and a lower side connecting plate (second connecting plate) 457; between the holding plate 451 and the upper side connecting plate 455 is firmly held an upper side cylindrical body (first cylindrical body) 454; and between the upper side connecting plate 455 and the lower side connecting plate 457 is firmly held a lower side cylindrical body (second cylindrical body) 456.

Herein, the upper side cylindrical body 454 is provided to have the axial direction thereof within a horizontal plane in the direction orthogonal to the longitudinal direction of the guide rail 200. The lower side cylindrical body 456 is provided to have the axial direction thereof within a horizontal plane in the direction parallel to the longitudinal direction of the guide rail 200. Namely, the upper side cylindrical body 454 and the lower side cylindrical body 456 make an angle of 90 degrees across the upper side connecting plate 455, and the direction in which the holding plate 451 moves swingingly with a support by the upper side cylindrical body 454 and the direction in which the upper side cylindrical body 454 moves swingingly with a support by the lower side cylindrical body 456 make an angle of 90 degrees.

Further, on the bottom face of the lower side connecting plate 457 is formed a conical convex section 457B projecting in the conical form, and this conical convex section 457B freely engages with the conical concave section 452A on the fixed plate 452, so that the lower side connecting plate 457 is pivoted to the fixed plate 452.

It is to be noted that the upper side cylindrical body 454 is firmly held between a V-shaped groove 451A grooved on the bottom side of the holding plate 451 and a V-shaped groove 455A grooved on the top side of the upper side connecting plate 455, while the lower side cylindrical body 456 is firmly held between a V-shaped groove 455B grooved on the bottom side of the upper side connecting plate 455 and a V-shaped groove 457A grooved on the top side of the lower side connecting plate 457, so that each location described above is maintained.

The holding plate 451 slidably moves along the axial direction of the upper side cylindrical body 454, while the upper side connecting plate 455 slidably moves along the axial direction of the lower side cylindrical body 456.

The backboard-side holding section 460 is provided on the surface side of the backboard section 412 between the pulling springs 430, 430.

The backboard-side holding section 460 comprises, as shown in FIG. 3, a holding plate 461 with one face thereof formed on a flat face applied onto the guide rail 200, a fixed plate 462 fixed to the backboard section 412, and a coupling section 463 for coupling the holding plate 461 in the state where it can move swingingly in relation to the fixed plate 462.

The coupling section 463 comprises a ball body 463 firmly held between the holding plate 461 and the fixed plate 462. Herein, a V-shaped groove 461A is grooved on the holding plate 461, while a V-shaped groove 462B is grooved on the fixed plate 462, and the V-shaped groove 461A on the holding plate 461 and the V-shaped groove 462B on the fixed plate 462 make an angle of 90 degrees across the ball body 463. In addition, the ball body 463 is held in the position where the V-shaped groove 461A and the V-shaped groove 462B intersect three-dimensionally. Further between the holding plate 461 and the fixed plate 462 is provided a retainer 464, and by the retainer 464 is held the ball body 463 between the holding plate 461 and the fixed plate 462.

The holding plate 461 slidably moves to the axial direction of the V-shaped groove 461A, while the ball body 463 slidably moves to the axial direction of the V-shaped groove 462B.

Configuration of the backward supporting device 500 is fundamentally the same as that of the forward supporting device 400, except that the backward supporting device 500 does not have a joint section 420, and it has a different configuration of the mounting section-side holding section from that of the forward supporting device 400.

Figure 6:
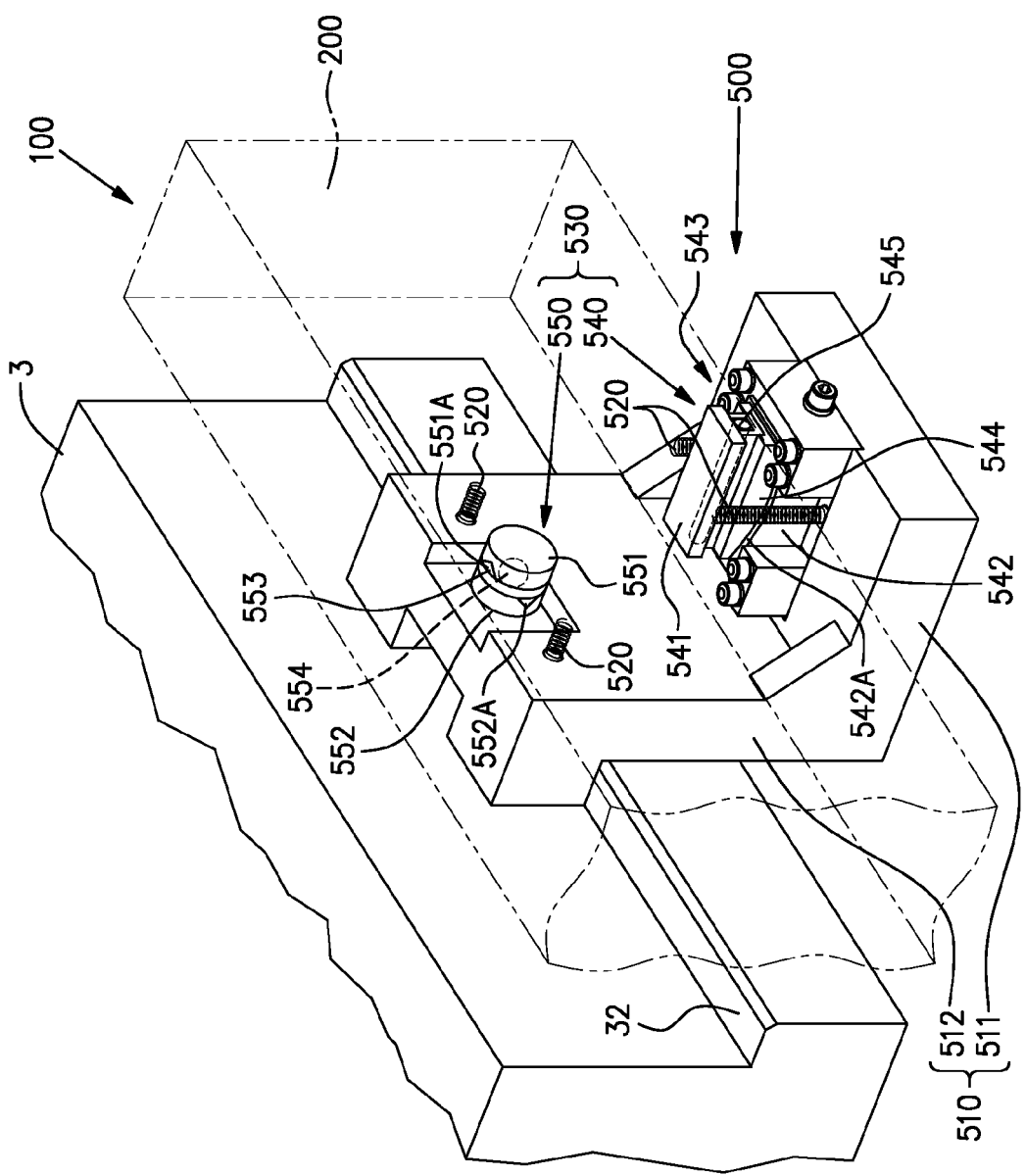
FIG. 6 is a view showing a configuration of a backward supporting device in the embodiment described above.

The backward supporting device 500 comprises, as shown in FIG. 6, a base body 510, a pulling spring 520, and a holding section 530.

The base body 510 comprises a mounting section 511 and a backboard section 512, as is the case with the base body 410 of the forward supporting device 400.

Two pulling springs 520 are provided on the mounting section 511, and another two pulling springs 520 are provided on the backboard section 512. Two pulling springs 520 are provided, on the mounting section 511, in the longitudinal direction of the guide rail 200 with a holding section 530 placed therebetween. Further, another two pulling springs 520 are provided, on the backboard section 512, with a prespecified distance maintained therebetween along the longitudinal direction of the guide rail 200.

The holding section 530 comprises a mounting section-side holding section 540 and a backboard-side holding section 550.

The mounting section-side holding section 540 comprises a holding plate 541 with the top face thereof formed on a flat face applied onto the guide rail 200, a fixed body 542 fixed to the mounting section 511 with the top face thereof having a circular-arc concave section 542A having a circular-arc cross section, and a coupling section 543 for coupling the holding plate 541 in the state where it can move swingingly in relation to the fixed body 542.

The holding plate 541 is a plate-like body having a length thereof in the direction orthogonal to the longitudinal direction of the guide rail 200.

The circular-arc concave section 542A on the fixed body 542 has, in a cross section orthogonal to the longitudinal direction of the guide rail 200, a circular-arc shape being deeper in the central portion thereof and increasingly higher from the central part toward both ends thereof.

The coupling section 543 comprises a swingingly-moving body 544 in the state where it moves swingingly within a face orthogonal to the longitudinal direction of the guide rail 200 supported by the fixed body 542 in the swingingly-moving state, and a cylindrical body 545 provided on the top side of the swingingly-moving body 544 and supporting the holding plate 541 in the swingingly-moving state.

The swingingly-moving body 544 has an arc on the bottom face thereof, is engaged with the circular-arc concave section 542A on the fixed body 542, has a hog-backed shape, and moves swingingly in the direction parallel to the longitudinal direction of the guide rail 200 as a swingingly-moving axis.

The cylindrical body 545 is provided having an axial direction thereof in the direction orthogonal to the longitudinal direction of the guide rail 200, and is firmly held between the holding plate 541 and the swingingly-moving body 544.

The holding plate 541 swingingly moves, with a swingingly-moving support by the cylindrical body 545, having a swingingly-moving axis thereof in the direction orthogonal to the longitudinal direction of the guide rail 200. Namely, the swingingly-moving axis of the swingingly-moving body 544 and that of the holding plate 541 intersect three-dimensionally making an angle of 90 degrees.

The backboard-side holding section 550 has the same configuration as that explained for the backboard-side holding section 460 of the forward supporting device 400; comprises a holding plate 551, a fixed plate 552 and a coupling section 553; and has thereon a ball body 554 firmly held between a V-shaped groove 551A formed in the holding plate 551 and a V-shaped groove 552A formed in the fixed plate 552.

The use and action of the guide rail device 100 having a configuration as detailed above is described below.

At first, the forward supporting device 400 and the backward supporting device 500 are set on the side face of the measuring table 3. At this time, the hook section 413 is hooked on the flange mounting section 32 to fix the base bodies 410, 510 to the measuring table 3. Then the base bodies 410, 510 are fixed to the measuring table 3 with a prespecified fixing section, and the fixing section may be, for instance, a screw clamp.

After the forward supporting device 400 and the backward supporting device 500 are set on the side face of the measuring table 3, the guide rail 200 is put on the forward supporting device 400 and the backward supporting device 500. To the forward supporting device 400, the guide rail 200 is jointed to the joint block 422, and further the pulling spring 430 is attached to the guide rail 200. Then the guide rail 200 is placed on the holding plate 451 of the mounting section-side holding section 450, and the side face of the guide rail 200 is held by the holding plate 461 of the backboard-side holding section 460. At this time, pressuring force applied to the ball body 425 is adjusted by adjusting the adjustment screw 428, and the guide rail 200 is subjected to an alignment adjustment to be put into the state where the guide rail 200 is in parallel to one edge of the measuring table 3. After the alignment of the guide rail 200 is adjusted, the adjustment screw 428 is tightened up to fix the swingingly-moving connecting plate 426.

To the backward supporting device 500, the pulling spring 520 is jointed to the guide rail 200, the guide rail 200 is placed on the holding plate 541 of the mounting section-side holding section 540, and the side face of the guide rail 200 is held by the holding plate 551 of the backboard-side holding section 550. Then, in this state, the guide rail 200 is supported in the position along the side face of the measuring table 3.

When a workpiece or the like is placed on the measuring table 3, there is a disadvantageous possibility that the measuring table 3 is deformed owing to weight of the workpiece W. Further, when one edge side and another edge side of the measuring table 3 have a different temperature to each other, there is a disadvantageous possibility that the measuring table 3 is deformed including a bend. Then, along with the deformation in the measuring table 3, the position or direction of the forward supporting device 400 and the backward supporting device 500 disadvantageously changes from the original state.

Herein, the guide rail 200 is put on the holding device (the forward supporting device 400, the backward supporting device 500) in the state where the guide rail 200 is held by the holding section 440, 530. In addition, the holding plates 451, 461, 541, 551 holding the guide rail 200 are supported in the state where they move swingingly by the cylindrical bodies 454, 456 or the ball bodies 463, 554. Thus the quantity just as much as the direction of the base bodies 410, 510 changes is absorbed by a swinging movement in which the holding plates 451, 461, 541, 551 are swingingly moved by a swingingly-moving support by the cylindrical bodies 454, 456 and the ball bodies 463, 554.

For instance, in the mounting section-side holding section 450, the holding plate 451 swingingly moves having, as a swingingly-moving axis, the cylindrical bodies 454, 456 three-dimensionally intersecting at right angles to each other, and further, rotates on the pivot bearing (452A, 457B) as the central axis. Further the holding plate 451 slides along the axial direction of each of the cylindrical bodies 454, 456.

Additionally, in the mounting section-side holding section 540, the holding plate 541 swingingly moves along a curve of a semicircle concave section 542A, and also swingingly moves having the cylindrical body 545 as a swingingly-moving axis.

In the backboard-side holding section 460, 550, the holding plates 461, 551 swingingly move having the ball bodies 463, 554 as a supporting point for the swinging movement, and slidably move along the V-shaped grooves 461A, 462A, 551A, 552A.

Namely, the mounting section-side holding section 450, 540 make the holding plates 451, 541 move swingingly in response to a change in any direction produced in the base bodies 410, 510, and keep the holding plates 451, 541 horizontal. Further, the backboard-side holding section 460, 550 make the holding plates 461, 551 move swingingly in response to a change in any direction produced in the base bodies 410, 510, and keep the holding plates 461, 551 vertical.

Then, when the position or direction of the base bodies 410, 510 changes along with deformation of the measuring table 3, a change as described above is offset by a swinging movement of the holding plates 451, 541, 461, 551, so that the change of direction in the base body 410 is not transmitted to the guide rail 200, which enables the guide rail 200 to be supported maintaining straightness thereof.

In addition, when there is a temperature change in the surrounding environment, there are some cases where a linear expansion quantity of the measuring table 3 and that of the guide rail 200 are different to each other. The guide rail 200 is jointed to the forward supporting device 400, whereas is not jointed to the backward supporting device 500 but just put thereon, so that the measuring table 3 and the guide rail 200 expand and contract without restricting to each other. Namely, difference in expansion and contraction between the measuring table 3 and the guide rail 200 can be let out on the side of the backward supporting device 500. Thus excessive force does not act on the guide rail 200, and the guide rail 200 is supported in the straight state.

Furthermore, the guide rail 200 and the measuring table 3 expand and contract without restricting each other. Nevertheless, one end of the guide rail 200 is jointed to the forward supporting device 400, so that a relative position between the measuring table 3 and the guide rail 200 is not changed on the side of one end thereof. Thus, for instance, when a scale member is stuck on the guide rail 200, the position of the original point thereon in relation to the measuring table 3 will not be deviated.

As can be seen, the guide rail device having a configuration as described above can have advantages as follows:
(1) The guide rail 200 is held by the holding section 440, 530, so that a change produced in the measuring table 3 is offset by a swinging movement of the holding section 440, 530. Then deformation of the measuring table 3 does not affect the guide rail 200, and consequently, straightness of the guide rail 200 is maintained.
(2) The guide rail 200 is jointed to the joint section 420 in relation to the forward supporting device 400, whereas is not jointed to the backward supporting device 500, so that the measuring table 3 and the guide rail 200 expand and contract without restricting to each other. Therefore, when there is a difference in expansion and contraction between the measuring table 3 and the guide rail 200, excessive force does not act on the guide rail 200, so that straightness of the guide rail 200 is maintained.
(3) The guide rail 200 is jointed to the forward supporting device 400 by the joint section 420, so that a relative position between the measuring table 3 and the guide rail 200 is fixed in the forward supporting device 400. Thus, in a case where a scale member is stuck on the guide rail 200, a relative position between the scale member and the measuring table 3 can be fixed to prevent the original point from deviating.
(4) As described above, straightness of the guide rail 200 is maintained and the position of the original point of a scale member is retained, and as a result of that, it is possible to maintain a driving speed of the driving mechanism (driving device) for making a slide member move slidably on the guide rail 200, to improve detecting accuracy of a displacement detector having a scale member thereon, arid further to improve positioning accuracy of the driving mechanism.

Next an example of a variant of the guide rail device according to the present invention is described below.

A fundamental configuration of the variant is the same as that in the embodiment described above, though the variant has characteristics in the configuration of a holding section.

Figure 7:
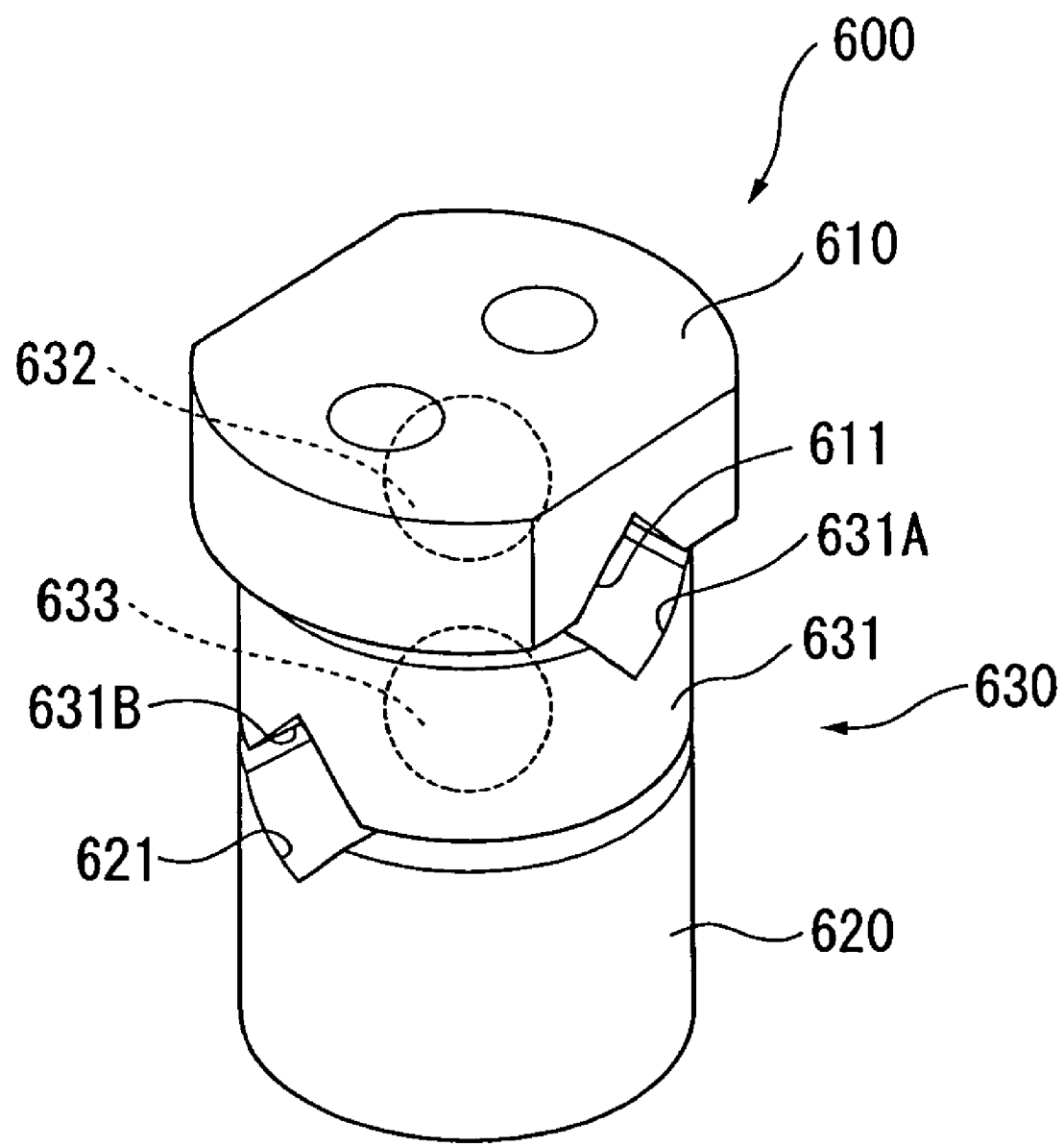
FIG. 7 is a view showing a configuration of a holding section in a variant concerning the guide rail device according to the present invention.
Figure 9A:
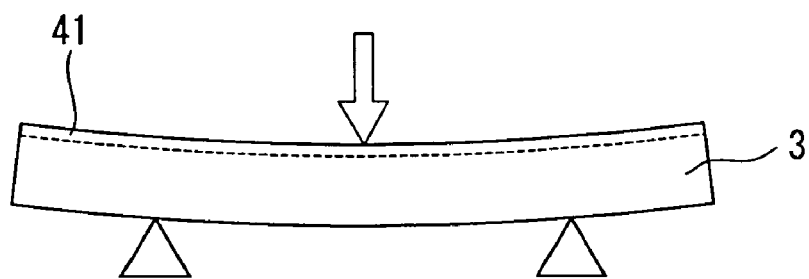
FIGS. 9A and 9B are views each showing the state where the conventional guide rail is bent.
Figure 9B:
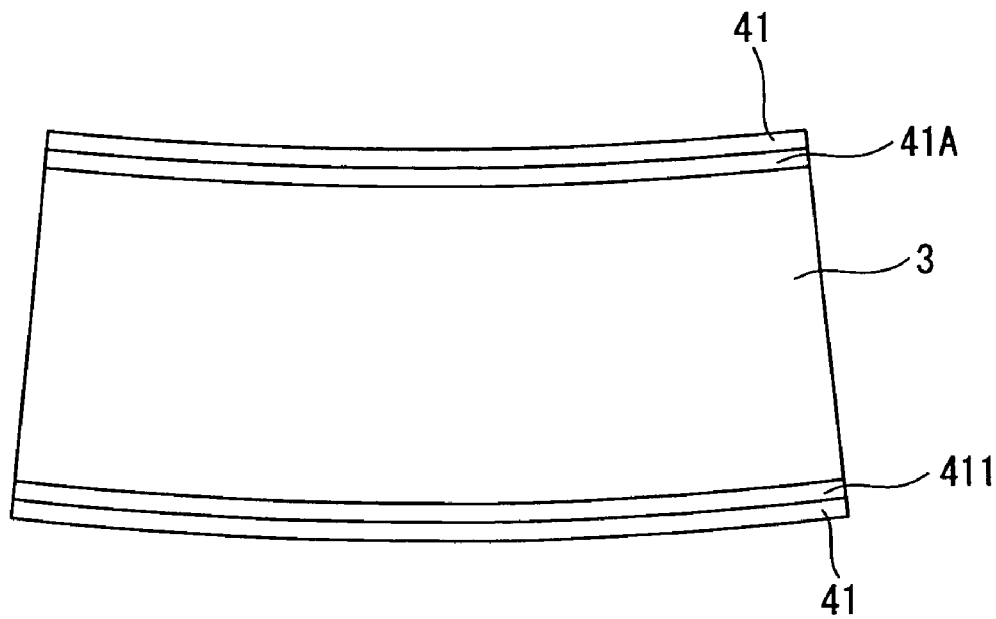

The configuration of the holding section in the variant is shown in FIG. 7. In FIG. 7, a holding section 600 comprises a holding plate 610 with one face thereof formed on a flat face applied onto the guide rail 200, a fixed plate 620 fixed to the base bodies (410, 510), and a coupling section 630 for connecting the holding plate 610 in the state where it can move swingingly in relation to the fixed plate 620.

The coupling section 630 comprises a connecting plate 631 placed between the holding plate 610 and the fixed plate 620, a ball body 632 firmly held between the connecting plate 631 and the holding plate 610, and a ball body 633 firmly held between the connecting plate 631 and the fixed plate 620.

Each of the holding plate 610 and the connecting plate 631 has a V-shaped groove on each opposing face thereto, namely, the holding plate 610 has a V-shaped groove 611, while the connecting plate 631 has a V-shaped groove 631A. Then the ball body 632 is firmly held from both sides in the state where it is engaged with the V-shaped groove 611 of the holding plate 610 and the V-shaped groove 631A of the connecting plate 631.

Further, each of the fixed plate 620 and the connecting plate 631 has a V-shaped groove on each opposing face thereto, namely, the fixed plate 620 has a V-shaped groove 621, while the connecting plate 631 has a V-shaped groove 631B. Then the ball body 633 is firmly held from both sides in the state where it is engaged with the V-shaped groove 621 of the fixed plate 620 and the V-shaped groove 631B of the connecting plate 631.

Herein, the V-shaped grooves 631A, 631B grooved on the top face and the bottom face of the connecting plate 631 respectively are formed in the direction three-dimensionally intersecting to each other, making an angle of 90 degrees.

In the configuration as described above, the connecting plate 631 moves swingingly in relation to the fixed plate 620 with a swingingly-moving support by the ball body 633. The holding plate 610 moves swingingly in relation to the connecting plate 631 with a swingingly-moving support by the ball body 632. Namely, the holding plate 610 moves swingingly via the coupling section 630 in relation to the fixed plate 620.

Further, the holding plate 610 slidably moves along the V-shaped groove 611 in relation to the ball body 632, while the connecting plate 631 slidably moves along the V-shaped groove 631B in relation to the ball body 633. Namely, the holding plate slidably moves in relation to the fixed plate in the back/forward and right/left directions.

Further, the holding plate 610 can rotate on the ball body 632 as a supporting point, while the connecting plate 631 can rotate on the ball body 633 as a supporting point.

With the configuration as described above, the holding plate 610 can swingingly move, slide and rotate in relation to the fixed plate 620. When the guide rail 200 is held by this holding section 600, a change in the posture or position of the base bodies (410, 510) is offset by a swinging movement, slide and rotation of the holding plate 610. Then the guide rail 200 is supported maintaining a state of straightness thereof without applying an excessive force thereon.

Further, a swinging movement of the holding plate 610 by the coupling section 630 is through a swingingly-moving support by the ball bodies 632, 633, so that resistance during the swinging movement is low. Thus a change produced in the base bodies (410, 510) is sufficiently offset by the swinging movement of the holding plate 610, and straightness of the guide rail 200 is maintained without applying excessive force thereon.

It is to be noted that the present invention is not limited to the embodiment described above, and variants, improvements, and the like within the range in which the object of the present invention can be achieved are included in the present invention.

Description above assumes a case where the guide rail 200 is straight, however the case is allowable where the guide rail 200 is curved from the beginning. According to the present invention, the guide rail 200 can be supported without deforming an original form thereof whether the guide rail 200 is straight or curved.

A driving device according to the present invention may be configured in which a movable member is provided in the state where it moves slidably on the guide rail 200 of the guide rail device 100 explained in the embodiment described above. Further, a measuring instrument according to the present invention may be configured in which a stylus is moved by the driving device, and a displacement detector for detecting displacement of the movable member is provided. As a measuring instrument like this, the coordinate measuring instrument described in the related art is given as an example, however, the measuring instrument according to the present invention is not limited to the coordinate measuring instrument, but may be a measuring instrument having a configuration in which a stylus is moved straight (for instance, a surface roughness measuring instrument).

It is described above that the guide rail 200 is carried by one forward supporting device 400 and one backward supporting device 500, and, for instance, not one but two or more backward supporting devices 500 may be provided, namely, a necessary number of the backward supporting device(s) 500 may be provided corresponding to the length of the guide rail 200.

It is to be noted that, as in the embodiment described above, the bottom face of the guide rail 200 is sufficiently held on three points, namely, by two mounting section-side holding section 450, 450 each provided on the forward supporting device 400 and the mounting section-side holding section 540 of the backward supporting device 500, however, the guide rail 200 may be held on three points or more.

It is described above that the guide rail 200 is attached to a side face of the measuring table 3, and the position to which the guide rail 200 is provided is not limited to the side face of the measuring table 3 but may be to the top side or the bottom side of the measuring table 3.

It is described above that the base bodies 410, 510 are engaged onto the measuring table 3 so that the mounting sections 411, 511 are in the horizontal state, however, the mounting sections 411, 511 and the backboard sections 412, 512 may be provided in the oblique state at an angle of 45 degrees. Thus the configuration is allowable in which the guide rail 200 is received in the position where the base bodies 410, 510 in the state where they are provided obliquely form a valley.

The priority application Number JP2004-017091 upon which this patent application is based is hereby incorporated by reference.

What is claimed is:

1. A driving device comprising:
   a guide rail supporting device,
   a guide rail supported by the guide rail supporting device, and
   a movable member provided on said guide rail in the state where said movable member can move along said guide rail, wherein
   said guide rail supporting device is for supporting the guide rail used for guiding the movable member while keeping the guide rail in a substantially fixed position in relation to a base table, the guide rail supporting device further comprising:
   a holding section for holding said guide rail such that, when at least one of said base table or said guide rail is deformed, deformation in one side of said at least one of said base table or guide rail is not transmitted to an other side of said at least one of said base table or guide rail, wherein said holding section holds said guide rail in at least a state in which said guide rail can swing relative to said base table or a state in which said guide rail can move forward and backward relative to said base table.

2. The driving device according to claim 1 further comprising:
   wherein said guide rail supporting device comprises a base body, said base body engaged onto said base table and carrying said guide rail,
   wherein said holding section comprises a holding plate abutting on said guide rail to hold the guide rail, a fixing plate fixed to said base body, and a holding coupling section for coupling said holding plate in the state in which said holding plate can swing relative to said fixing plate.

3. The driving device according to claim 1 further comprising:
   wherein said guide rail supporting device comprises a base body, said base body engaged onto said base table and carrying said guide rail, and
   a pulling section loaded between said base body and said guide rail for pulling said guide rail toward said base body.

4. The driving device according to claim 1 further comprising:
   wherein said guide rail supporting device comprises a base body, said base body engaged onto said base table and carrying said guide rail,
   wherein said base body comprises a mounting section, which is in a horizontal state when the base table is engaged onto said base table, to support said guide rail from below, and a backboard section, which continuously rises from one edge of said mounting section, to be engaged onto said base table,
   wherein said holding section comprises a mounting section-side holding section provided on said mounting section for propping up said guide rail, and a backboard-side holding section for holding said guide rail on the side of said backboard.

5. The driving device according to claim 1 further comprising:
wherein said guide rail supporting device comprises a one end-side supporting device for supporting one end side of said guide rail, and another supporting device for supporting an other portion of said guide rail,
wherein said one end-side supporting device comprises a base body engaged onto said base table and carrying said guide rail, and a joint section for jointing said guide rail and said base body.

6. The driving device according to claim 1 further comprising:
wherein said guide rail supporting device comprises a base body, said base body engaged onto said base table and carrying said guide rail, and
a joint section for jointing said guide rail and said base body,
wherein said joint section comprises a fixed portion fixed to said base body, a joint portion jointed to said guide rail, and a joint coupling section provided between said fixed portion and said joint portion for coupling said joint portion to said fixed portion in the state in which said joint portion can swing relative to said fixed portion.

7. A measuring instrument comprising:
a measuring table serving as a base table for putting a workpiece thereon,
a guide rail supporting device,
a guide rail supported by the guide rail supporting device, and
a movable member provided on said guide rail in the state where said movable member can move along said guide rail,
a detecting probe moved by said movable member for detecting a surface of said workpiece,
a displacement detector for detecting a relative displacement quantity of said movable member in relation to said guide rail, and
an analysis section for analyzing a form of said workpiece based on the surface of said workpiece detected by said detecting probe and a value detected by said displacement detector, wherein
said guide rail supporting device is for supporting the guide rail used for guiding the movable member while keeping the guide rail in a substantially fixed position in relation to a base table, the device guide rail supporting further comprising,
a holding section for holding said guide rail such that, when at least one of said base table or said guide rail is deformed, deformation in one side of said at least one of said base table or guide rail is not transmitted to an other side of said at least one of said base table or guide rail, wherein said holding section holds said guide rail in at least a state in which said guide rail can swing relative to said base table or a state in which said guide rail can move forward and backward relative to said base table.

* * * * *